Feb. 9, 1971 HISAO MATSUMOTO 3,561,251

TOOLS FOR COUPLING PIPES WITH OTHER MEMBERS

Filed Jan. 26, 1968

INVENTOR.
HISAO MATSUMOTO
BY
ATTORNEY

Feb. 9, 1971     HISAO MATSUMOTO     3,561,251

TOOLS FOR COUPLING PIPES WITH OTHER MEMBERS

Filed Jan. 26, 1968     3 Sheets-Sheet 3

INVENTOR.
HISAO MATSUMOTO
BY
ATTORNEY

United States Patent Office 3,561,251
Patented Feb. 9, 1971

3,561,251
TOOLS FOR COUPLING PIPES WITH OTHER MEMBERS
Hisao Matsumoto, 406-1 Aza-Ishizuka, Misono,
Amagasaki-shi, Hyogo-ken, Japan
Filed Jan. 26, 1968, Ser. No. 700,899
Claims priority, application Japan, Feb. 4, 1967,
42/7,368
Int. Cl. B21d 37/10
U.S. Cl. 72—416                                    8 Claims

ABSTRACT OF THE DISCLOSURE

This invention relates to tools for firmly joining pipes through the use of compression couplings.

This invention relates to apparatus for joining pipes and to the joints and tools therefor, and which are particularly useful for the connection of pipes in plumbing and industrial applications as for instance water pipes, town gas pipes and electrical wiring pipes, etc.

In the conventional plumbing operations, threaded joints are widely used for the connection of pipes, but male threads must be formed on the pipe ends and this procedure is time consuming and expensive. Further, in order to cut the male threads, the pipe must be thick enough to enable the formation of the male threads, with the result that the entire pipe must be of equal thickness. This produces a substantial increase in weight of the pipe which increases transportation and plumbing costs. In addition, the connection by means of threaded joints frequently results in leakage at the joint portions because of vibration and imperfect threads.

Therefore, in place of the threaded joints, threadless joints of various structures have been used, but known threadless joints consist of many parts which require precise fabrication which adds materially to the cost.

Further, although there is a method by which press roll is pressed against the outer periphery of overlapped pipes and while the pipes are rotated they are tightly adhered one to the other, a substantial area and large facilities are required, and further, this method cannot be practiced at the site of the plumbing because bent pipes, branched pipes and pipes of small diameter cannot be connected by this method. Welding, which is utilized for the connection of pipes of large diameter is not easily applicable to pipes of small diameter.

An object of this invention is to provide an improved method of joining pipes using a joint of a simple structure and without requiring the troublesome process of cutting threads at the end portions of the pipes.

An object of this invention is to provide joints and tools which are suitable for the practice of the abovementioned improved method.

In addition to the connection of pipes with a joint, there is a case that one of the pipe ends can be inserted into the other pipe end. Therefore, another object of this invention is to provide a method and tools by which two pipes can be directly joined one to the other.

A further object of the invention resides in the provision of an improved method and apparatus for securing coupling and terminating members to pipes.

According to this invention, a member is telescoped over the outer surface of a pipe. This member may be a joint for connecting another pipe, a telescoping pipe, or another structure such as a valve or the like. Then, a tool is applied to the outer surface of the member, and the member is compressed toward the center of the pipe. The member is made of metal or other material which will permanently maintain the deformation it receives, and therefore, a permanent coupling of the pipe and the member is accomplished by said compression. The member is preferably made of such material as duralumin alloy, for example, which hardens when worked. It may be also preferable that the pipe has a deformation recovering property larger than that of the member so that adhesion of the pipe and the member becomes more complete. If necessary, a bonding agent or a packing may be inserted between the pipe and the member in order to maintain a good hermetic connection.

Other objects and features of this invention will be clearly understood from the explanation hereinafter made referring to the drawings and from the description of the claims.

Figure 1:
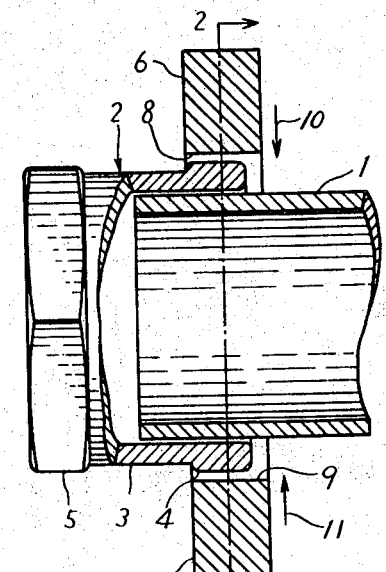
FIG. 1 is a partial sectional view showing the relationship of a pipe, a joint and a tool before compression operation and illustrates an example of one embodiment of this invention in which a joint for the connection of another pipe is to be coupled to an end of a pipe.
Figure 2:
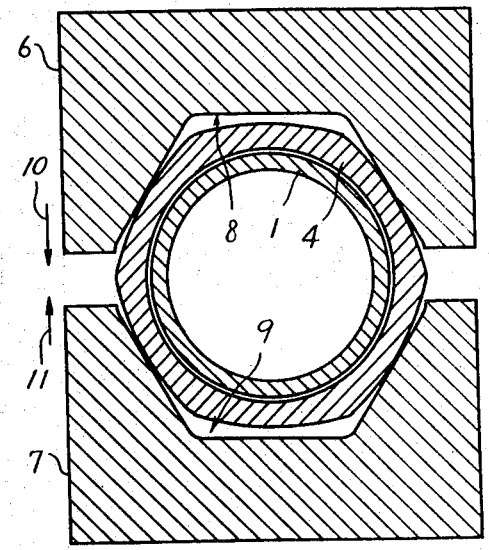
FIG. 2 is a sectional view taken along line 2—2 of FIG. 1.

Referring to the example of embodiment of this invention shown in FIGS. 1 to 4, a joint 2 is telescoped over an end portion of a pipe 1 as is shown in FIG. 1. The joint 2 is a short tubular body having an inner diameter which is a little larger than the outer diameter of the pipe 1, its central portion 3 is of a cylindrical contour, and its two end portions 4 and 5 are of hexagonal section having a wall thickness thicker than that of the central portion 3. It should be noted that the surfaces of the hexagons formed on the portions 4 and 5 are not linear but are curved outwardly as is shown in FIG. 2.

Then the outer surface of the end portion 4 of the joint 2 which is telescoped over the pipe 1 is clamped from two sides by tools 6 and 7. The tools 6 and 7 respectively are provided with recesses 8 and 9 each having a contour which corresponds to a half of a hexagon, and these recesses are fitted to the outer surface of the end portion 4 of the joint 2. It should be noted that the surfaces of halves of the hexagon formed by the recesses 8 and 9 of the tools 6 and 7 are linear as is shown in FIG. .

Figure 3:
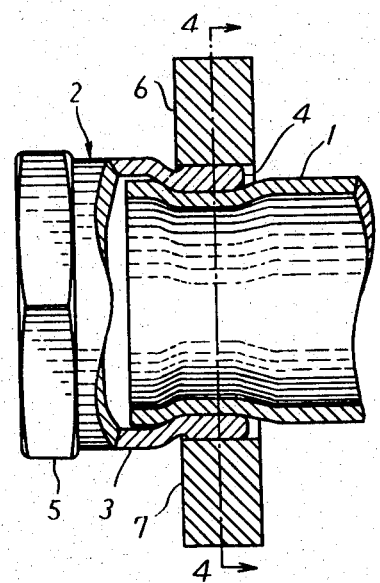
FIG. 3 is a view similar to FIG. 1 showing the completed connection.
Figure 4:
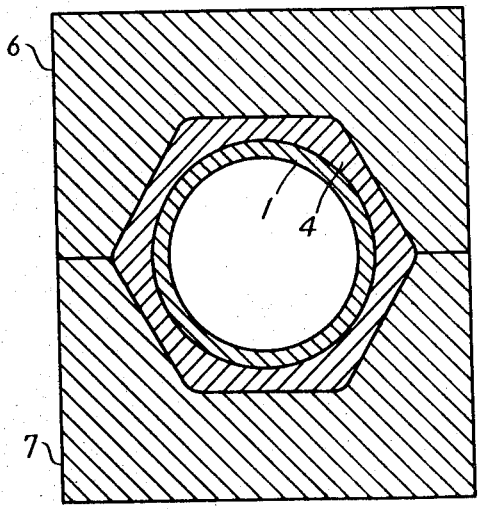
FIG. 4 is a sectional view taken along the line 4—4 of FIG. 3.

When forces sufficiently large are applied in the directions of arrows 10 and 11 to the tools 6 and 7, the end portion 4 of the joint is compressed and deformed as is shown in FIGS. 3 and 4 and its inner surface tightly adheres to the outer surface of the pipe 1. The compressed condition of the end portion 4 of the joint remains after the tools 6 and 7 are removed. The pipe 1 is also compressed by the end portion 4 of the joint, but due to the resilience of the pipe material a tight contact is produced between the pipe 1 and the joint 2 and the seal is maintained permanently. An improved coupling can be obtained if a bonding agent or a leak preventing agent is coated onto the inner surface of the joint 2 or the outer surface of the pipe 1 prior to the joining operation.

Figure 5:
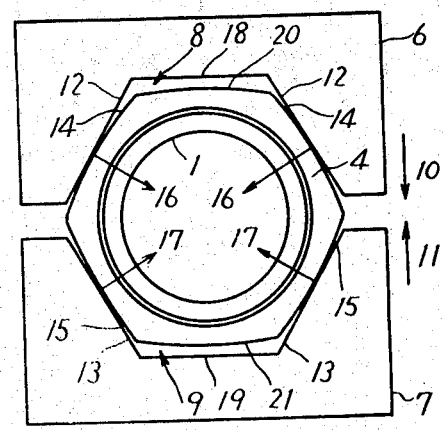
FIGS. 5 to 7 are explanatory diagrams illustrating the steps of compression occurring during the formation of the joint.
Figure 6:
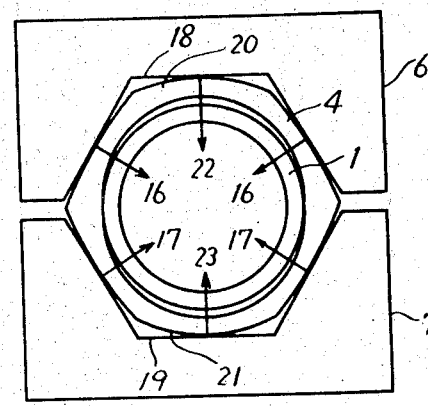
Figure 7:
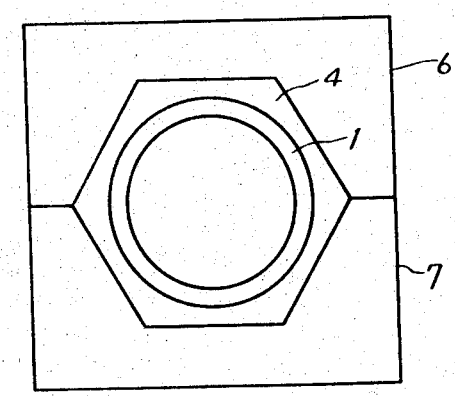

The deformation of the joint 2 at the time of the above-mentioned compression operation follows the processes shown in FIGS. 5 to 7. More specifically, at first when forces are applied to the tools 6 and 7 in the directions of the arrows 10 and 11, the wall surfaces 12, 12 and 13, 13 of the recesses 8 and 9 of the tools 6 and 7 contact the wall surfaces 14, 14 and 15, 15 of the joint 2 as shown in FIG. 5 and contact the latter surfaces at the central portions thereof and deflect them toward the center of the pipe 1 as indicated by the arrows 16, 16 and 17, 17. At this stage, the surfaces 18 and 19 of the recesses 8 and 9 of the tools 6 and 7 do not contact surfaces 20 and 21 of the joint portion 4.

In the next step of the process, the forces denoted by the arrows 16, 16 and 17, 17 form the joint portion 4 into an oblong contour as is shown in FIG. 6, and the bottom surfaces 18 and 19 of the recesses contact the surfaces 20 and 21 of the joint respectively.

In the final step, the forces denoted by the arrows 16, 22, 16 and 17, 23, 17 are applied to the whole periphery of the joint portion 4 compressing the whole body of the joint portion 4, and as is shown in FIG. 7, the contour of the outer periphery of the joint is deformed to produce a hexagonal contour by both recesses of the tools 6 and 7. It is preferable at this time that the inner periphery of the joint 2 be a true circle.

FIGS. 8 to 11 show one method for determining the sectional contour of the joint utilized in the foregoing embodiment.

Figure 8:
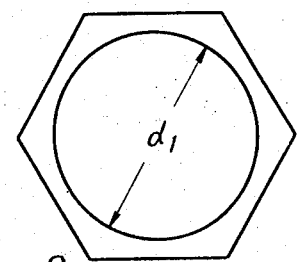
FIGS. 8 to 11 are explanatory diagrams illustrating one example of a method for determining the sectional contour of the joint illustrated in FIGS. 1 to 4.

First, let it be assumed that the completed joint contour will take the form as shown in FIG. 7 and is to be produced from a joint structure as shown in FIG. 8. The contour and the size thereof conforms with the recesses in the tools, and the diameter $d_1$ of its inner periphery is determined taking into consideration the property of the material and the outer diameter of the pipe to be coupled therewith.

Figure 9:
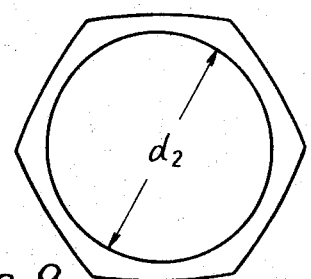

A conical tool is thus pressed into the joint shown in FIG. 8, and the inner diameter is expanded to a diameter $d_2$ as is shown in FIG. 9. Thus each side of the outer periphery is expanded to form a convex shape as is shown in the drawing. Then the joint is annealed so that stresses within the materials are removed.

Figure 10:
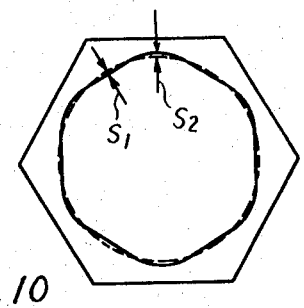

A tool is applied to the annealed joint to compress the joint. If the contour of the joint returns to the contour of FIG. 8, the contour and the size shown in FIG. 9 may be employed as the final ones, and the joints of said dimension may be manufactured. In many cases, however, the annealed joint may not return to the configuration of FIG. 8, but rather assumes the configuration shown in FIG. 10. The dotted line of FIG. 10 is an internal contour of the joint of FIG. 8 for the purpose of comparison. As can be seen from the drawing, portions of the inner periphery depart from a true circle by distances $S_1$ and $S_2$. The dimensions $S_1$ and $S_2$ are exaggerated in the drawing for purposes of illustration.

Figure 11:
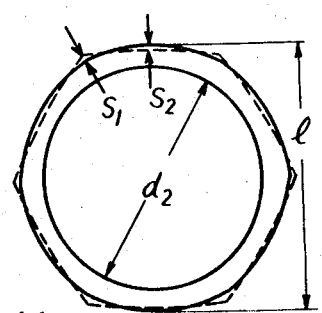

Finally, the outer surface of those portions of FIG. 11 having wall thicknesses increased by $S_1$ are reduced to produce the configuration shown in FIG. 9, and the thinner outer surface portions $S_2$ are increased by the distance $S_2$. The configuration thus formed is the desired configuration.

As an example of experiments conducted by the inventor of this invention, a joint was made of a soft steel in which a distance $l$ between opposing sides of the outer surface (see FIGS. 9 and 11) was 51.7 mm., inner diameter $d_2$ was 43 mm., the width of hexagonal portions at the two ends of the coupling 2 was 10 mm., and the wall thickness of the central portion 3 (see FIG. 1) was 4 mm. The joint or coupling was telescoped over a steel pipe having an outer diameter of 42.7 mm. and wall thickness of 3.7 mm., and the joint was compressed with tools to assume a regular hexagonal shape with the distance between opposing sides being 50 mm. The inner periphery of the joint was contracted to a diameter of 40.5 mm. maintaining a true circle, and it bit into the steel pipe 1.1 mm. deep as shown in FIG. 3. The compressing force applied to the tools at that time was about 20 tons, and with a manual oil pressure machine having a plunger of a diameter of 45 mm. and generating an internal pressure of 700 kg./cm.$^2$ the above-mentioned operation could be accomplished with a plunger stroke of about 5 mm.

It is preferable that the corners of the outer surface of the joint and the corners of the recesses of the tools are rounded as is shown in FIG. 2. By this arrangement, the portions expanding from the joint when the tools are brought into contact as shown in FIG. 4 will not enter the gap between the tools and interfere with the production of a tight joint. Furthermore, the tools will not be damaged upon the application of high pressures to the corners of the recesses.

In addition to the abovementioned example of one embodiment of the invention, there are various modifications that may be employed.

Figure 12:
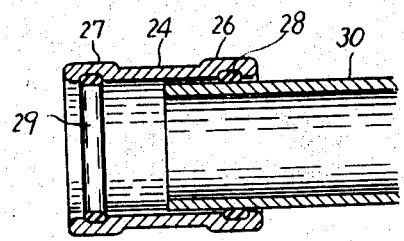
FIGS. 12 to 15 are diagrams of pipes and joints of other examples of embodiments of this invention.

The joint 24 shown in FIG. 12 has the same external contour as that of the example of the embodiment of FIG. 1, but the inner peripheries at the two end portions 26 and 27 are each provided with an annular groove in which packings 28 and 29 are contained. Accordingly, when a pipe 30 is inserted into the end portion 26 and the end portion is compressed a strong mechanical coupling as is shown in FIG. 3 can be obtained, and in addition, a good hermetic connection is obtained by reason of the interposition of the packing.

Figure 13:
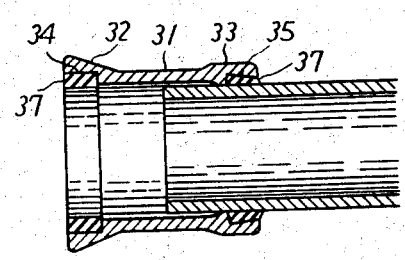

A joint 31 shown in FIG. 13 is provided with fastening portions 32 and 33 at each end which are tapered outwardly. Recesses 34 and 35 have cylindrical inner diameters and are provided with packings 36 and 37. In the drawing, tools are not yet applied to the fastening portion 32, but the portion 33 is shown in the compressed condition. In the application of tht tools, the outer surface of the portion 33 is deformed to provide a cylindrical configuration so that the inner diameter of the mouth portion of the recess 35 is reduced to a large extent, and displacement of the packing 37 is thus prevented.

Figure 14:
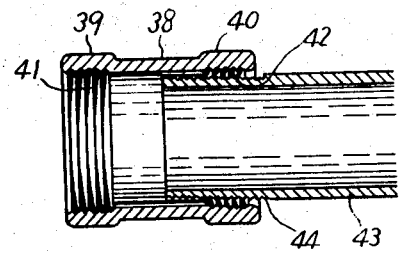

A joint 38 shown in FIG. 14 is the same as that shown in FIG. 1, but the inner peripheries of the fastening portions 39 and 40 are provided with annular grooves 41 and 42 respectively. Annular grooves 44 are provided on the outer surface of a pipe 43 which is to be inserted into the portion 40, and thereby when tools are applied to the portion 40, the grooves 42 bite into the grooves 44, and a stronger coupling between the joint and the pipe is obtained. Since the grooves 41, 42, and 44 are not necessarily as deep as normal threads, the strength of the pipe 43 is not impaired to the extent experienced in making normal threaded joints. Further, in the event that the hardnesses of the materials of the joint and the pipe are mutually different, the grooves may be provided on the harder material, and the grooves in the softer material may be omitted.

Figure 15:
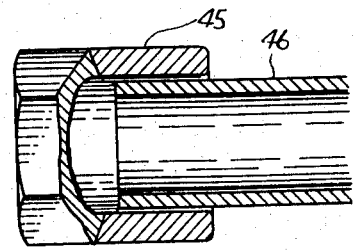

FIG. 15 shows a joint 45 for the same purpose as that of FIG. 1, but this joint is hexagonal throughout its length. This joint 45 is particularly suitable for use with a pipe 46 of a small diameter.

Figure 16:
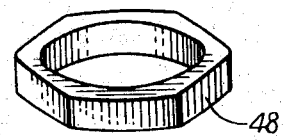
FIG. 16 is a perspective view of a hexagonal member which is to be fixed to a pipe in accordance with this invention.
Figure 17:
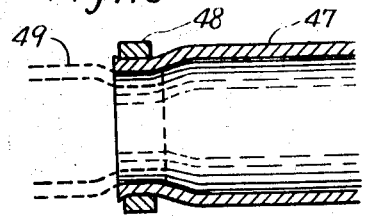
FIG. 17 is a sectional view of a pipe to which the member shown in FIG. 16 is affixed.

FIGS. 16 and 17 show an embodiment of this invention in which a member 48, instead of a joint, is mounted to an end of a pipe 47. The member 48 in this example also has an external dimension which is formed in the manner shown in FIGS. 8 to 11.

The member 48 is convenient when a wrench is to be applied to rotate the pipe 47. It may be preferable to provide longitudinal grooves on the inner surface of the member 48 and on the outer surface of the tube 47 so that the member 48 does not rotate about the pipe 47. Further, this member 48 is also useful for coupling the pipe 47 with a pipe 49 which is inserted into the pipe 47.

Figure 18:
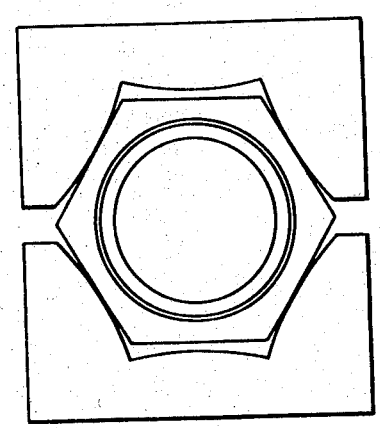
FIGS. 18 and 19 are sectional views of examples of other embodiments of this invention in which a member and a tool having different sectional contours from those of the foregoing examples are used.

The initial outer contour of the members 4, 26, 33, 40, 45, and 48 may be a regular hexagonal section surrounded by plane surfaces in place of convex surfaces. In this case, in order to make the inner periphery of the compressed member a true circle each of the inner surfaces of the recesses of the tools 6 and 7 are made convex as is shown in FIG. 18.

Figure 19:
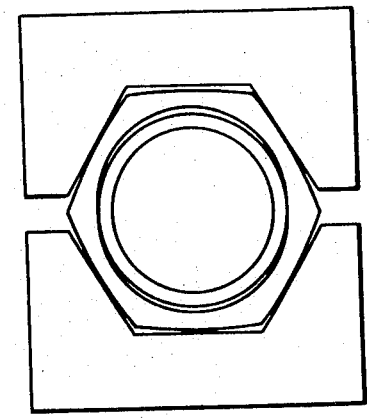

Further, the initial contour of the members may have oval openings as is shown in FIG. 19, and the ovals will become true circles when compressed with the tools.

In the foregoing examples of the invention, the member having a hexagonal outer surface and a circular inner surface is compressed, but the contour of the outer surface is not to be limited to a hexagon, it can be polygonal or circular, and in the case of the latter the tools to be applied thereto should each have a contour of a half of said polygonal or circular contour. In the case of any outer surface contours, it is preferable that the contour of the member before the compression is so chosen that each portion of the member is uniformly compressed toward the center thereof by the application of the tools.

While only certain embodiments of the invention have been illustrated and described, it is apparent that alterations, modifications and changes may be made without departing from the true scope and spirit thereof as defined by the appended claims.

What is claimed is:

1. Apparatus for securing a fitting having an internal cylindrical contour to the outer surface of a pipe having a cylindrical internal configuration while at the same time maintaining the inner circularity of said pipe comprising at least two pressure exerting tools movable into pressure engagement with and normal to the axis of said fitting and with the latter surrounding said pipe, said tools each having a recess coordinated with the outer configuration of said fitting to exert four angularly directed compressive forces on said fitting each having a substantial vector component perpendicular to the movement of said tools to produce an elliptical internal contour of said fitting with the sides of the fitting in pressure contact with the pipe, and then exerting compressive forces in alignment with the movement of said tools while maintaining the first said compressive forces to circularize the internal contour of said fitting and urge it into uniform compressive contact with said pipe and throughout the entire periphery thereof.

2. Apparatus according to claim 1 wherein said fitting has a generally hexagonal periphery, the recesses in said tools each include two convergent side walls and a bottom with the walls and bottom of each recess being shaped relative to the periphery of said fitting to provide initial line contact parallel to the axis of said pipe by each wall and bottom with the associated surface of said periphery.

3. Apparatus according to claim 2 wherein the sides of said hexagonal periphery are convex.

4. Apparatus according to claim 2 wherein said walls and bottom of each recess are convex.

5. Apparatus according to claim 3 wherein the intersections of said walls and bottoms of said recesses are curved.

6. Apparatus according to claim 4 wherein the intersections of said walls and bottoms of said recesses are curved.

7. Apparatus according to claim 1 wherein said fitting is a pipe coupling.

8. Apparatus according to claim 1 wherein said fitting is formed integrally with a second pipe.

References Cited

UNITED STATES PATENTS

| | | | |
|---|---|---|---|
| 1,768,095 | 6/1930 | Arthur | 285—382.2 |
| 1,889,795 | 12/1932 | Smith | 29—517 |
| 1,911,775 | 5/1933 | Smith | 29—517 |
| 2,205,893 | 6/1940 | Unger | 72—416 |
| 2,247,928 | 7/1941 | Temple | 29—517 |
| 2,906,017 | 9/1959 | Badeau | 29—518 |
| 3,067,489 | 12/1962 | Hoffman | 29—518 |
| 3,146,519 | 9/1964 | Redwine | 29—518 |
| 3,212,317 | 10/1965 | Lynch | 72—416 |
| 3,372,570 | 3/1968 | Mansell | 72—416 |

CHARLES W. LANHAM, Primary Examiner

G. P. CROSBY, Assistant Examiner

U.S. Cl. X.R.

29—516; 72—470; 285—382.2